US008761511B2

(12) United States Patent
Deaver

(10) Patent No.: US 8,761,511 B2
(45) Date of Patent: Jun. 24, 2014

(54) PREPROCESSING OF GRAYSCALE IMAGES FOR OPTICAL CHARACTER RECOGNITION

(76) Inventor: F. Scott Deaver, Houston, TX (US)

(*) Notice: Subject to any disclaimer, the term of this patent is extended or adjusted under 35 U.S.C. 154(b) by 778 days.

(21) Appl. No.: 12/638,915

(22) Filed: Dec. 15, 2009

(65) Prior Publication Data

US 2011/0075936 A1     Mar. 31, 2011

Related U.S. Application Data

(63) Continuation-in-part of application No. 12/571,291, filed on Sep. 30, 2009, now Pat. No. 8,457,347.

(51) Int. Cl.
*G06K 9/00*     (2006.01)

(52) U.S. Cl.
USPC ............ 382/178; 382/260; 382/299; 382/301

(58) Field of Classification Search
USPC .......................................................... 382/301
See application file for complete search history.

(56) References Cited

U.S. PATENT DOCUMENTS

| | | | | |
|---|---|---|---|---|
| 4,379,282 A | * | 4/1983 | Bailey | 382/178 |
| 4,680,803 A | * | 7/1987 | Dilella | 382/140 |
| 5,048,097 A | * | 9/1991 | Gaborski et al. | 382/156 |
| 5,270,836 A | * | 12/1993 | Kang | 358/3.07 |
| 5,757,381 A | * | 5/1998 | Shoji et al. | 345/684 |
| 5,768,414 A | * | 6/1998 | Jamali | 382/173 |
| 5,787,196 A | * | 7/1998 | Yair et al. | 382/178 |
| 5,809,183 A | * | 9/1998 | Serizawa et al. | 382/301 |
| 5,841,903 A | * | 11/1998 | Kikuchi | 382/203 |
| 6,023,526 A | * | 2/2000 | Kondo et al. | 382/165 |
| 7,072,513 B2 | * | 7/2006 | Kim et al. | 382/179 |
| 7,986,843 B2 | * | 7/2011 | Chaudhury et al. | 382/229 |
| 2003/0095270 A1 | * | 5/2003 | Guo et al. | 358/1.9 |
| 2004/0041920 A1 | * | 3/2004 | Mizukami et al. | 348/222.1 |
| 2004/0091177 A1 | * | 5/2004 | Eaton | 382/311 |
| 2005/0086255 A1 | * | 4/2005 | Schran et al. | 707/102 |
| 2011/0075940 A1 | | 3/2011 | Deaver | |
| 2011/0075942 A1 | | 3/2011 | Deaver | |

OTHER PUBLICATIONS

Natarajan et al. (2001) "OCR of low-resolution text images from diverse sources." Proc. 2001 Symp. on Document Image Understanding Technology, pp. 253 et seq.*
Gupta et al. (2007) "OCR binarization and image pre-processing for searching historical documents." Pattern Recognition, vol. 40 pp. 389-397.*
Lam et al. (Sep. 1992) "Thinning methodologies—a comprehensive survey." IEEE Trans. on Pattern Analysis and Machine Intelligence, vol. 14 No. 9, pp. 869-885.*
Wikipedia (Sep. 25, 2008) "Tethering.".*
Einsele-Aazami, F. (Jul. 2008) "Recognition of ultra low resolution, anti-aliased text with small font sizes." Thesis, University of Fribourg, pp. i-150.*
Wikipedia (Sep. 2008). "Samsung SGH-i607."*

* cited by examiner

*Primary Examiner* — Barry Drennan
(74) *Attorney, Agent, or Firm* — Cardle Patent Law Chtd

(57) ABSTRACT

A computer implemented that, in various aspects, transforms a grayscale image into an OCR image by applying a combination of steps to the grayscale image is disclosed herein. The grayscale image may include one or more alphanumeric characters. The grayscale image may includes visual content displayed upon a computer screen, so that the grayscale image may have a resolution generally equivalent to a screen resolution of the computer screen prior to application of the combination of steps thereto. The resultant OCR image, in various implementations, is of sufficient resolution and quality that an OCR engine can generally recognize alphanumeric characters imbedded within the OCR image.

16 Claims, 12 Drawing Sheets

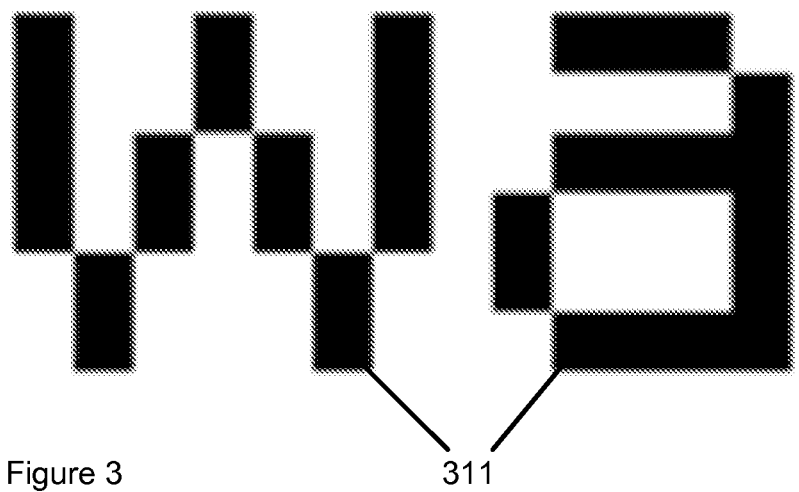
Figure 3        311
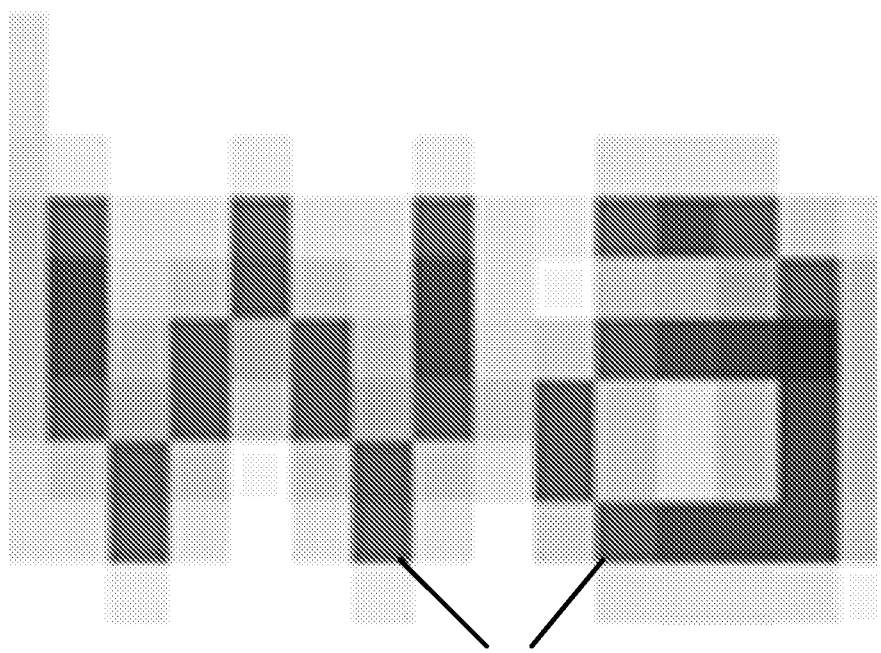
Figure 4        313

{471} {472} {473}
{474} {475} {476}
{477} {478} {479}

{471} {472} {473}
{474} {475} {476}
{477} {478} {479}

{471} {472} {473}
{474} {475} {476}
{477} {478} {479}

{471} {472} {473}
{474} {475} {476}
{477} {478} {479}

Figure 16
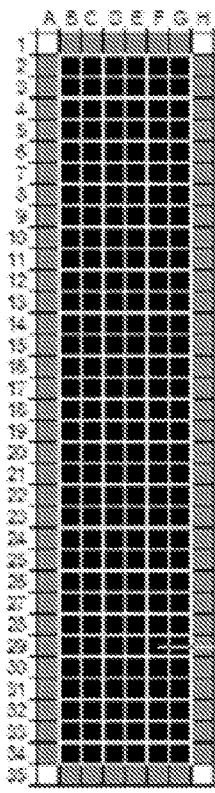
Figure 17A
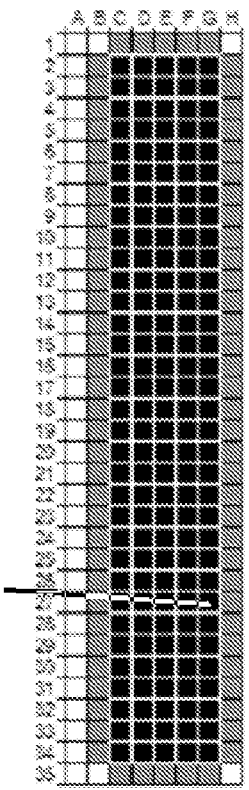
Figure 17B
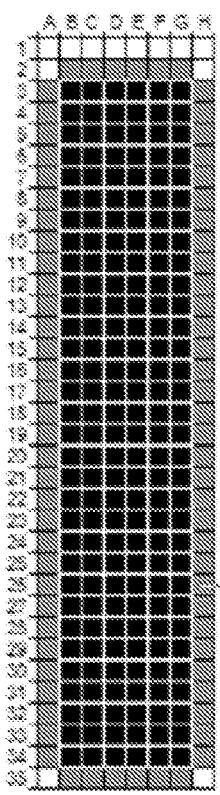
Figure 17C
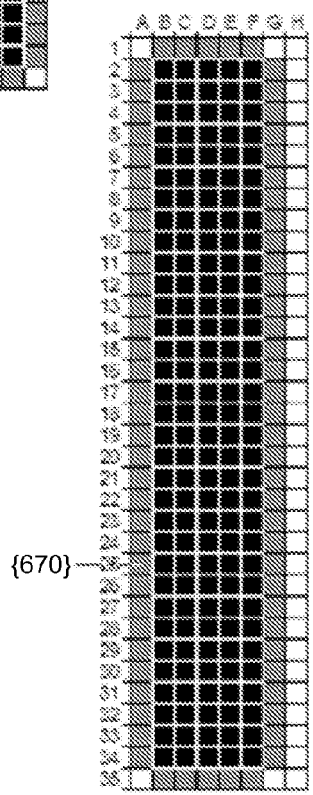
Figure 17D

PREPROCESSING OF GRAYSCALE IMAGES FOR OPTICAL CHARACTER RECOGNITION

CROSS REFERENCE TO RELATED APPLICATIONS

This present utility patent application is a continuation-in part application of co-pending U.S. patent application Ser. No. 12/571,291 entitled "Methods For Monitoring Usage of a Computer" by F. Scott Deaver and filed on 30 Sep. 2009, which is hereby incorporated in its entirety by reference herein.

BACKGROUND OF THE INVENTION

1. Field

The present disclosure relates to computer software, and, more particularly for computer software for processing screen images containing one or more alphanumeric characters.

2. Description of the Related Art

As part of a system for monitoring the content of a computer screen, a screen image may be formed that captures the content of a computer screen at a particular moment in time. The screen image may be in any suitable format such as JPEG, TIFF, and so forth. Information in the form of alphanumeric characters may be imbedded in the screen image, and it may be desirable to extract this information in the form of alphanumeric characters from the screen image. The screen image and any alphanumeric characters contained in the image are generally at the resolution of the computer screen, which may be a generally low resolution. In order to extract the information in the form of alphanumeric characters embedded in the screen image, it may be desirable to increase the resolution of the screen image from the generally low resolution of the computer screen to a higher resolution and otherwise process the screen image into a form suitable for processing by optical character recognition (OCR) software. Accordingly, there is a need for computer-implemented methods for processing the screen image into a form suitable for processing by optical character recognition (OCR) software, as well as related systems and compositions of matter.

BRIEF SUMMARY OF THE INVENTION

These and other needs and disadvantages are overcome by the methods, systems, and compositions of matter disclosed herein. Additional improvements and advantages may be recognized by those of ordinary skill in the art upon study of the present disclosure.

A computer implemented method is disclosed herein. In various aspect, this computer implemented method includes the steps of transforming a grayscale image into an OCR image by applying a combination of steps to the grayscale image. The grayscale image may include one or more alphanumeric characters. The combination of steps may include the steps of increasing the resolution of the grayscale image, removing signals from the grayscale image by applying one or more filters to the grayscale image, and sharpening the grayscale image by applying anti-aliasing. The grayscale image includes visual content displayed upon a computer screen in various implementations, so that the grayscale image may have a resolution generally equivalent to a screen resolution of the computer screen prior to application of the combination of steps thereto. The OCR image is of sufficient resolution and quality that an OCR engine can generally recognize alphanumeric characters imbedded within the OCR image, in various implementations.

This summary is presented to provide a basic understanding of some aspects of the methods disclosed herein as a prelude to the detailed description that follows below. Accordingly, this summary is not intended to identify key elements of the methods, systems, and compositions of matter disclosed herein or to delineate the scope thereof.

BRIEF DESCRIPTION OF THE DRAWINGS

FIG. 3 illustrates exemplary alphanumeric characters at a first stage of processing;

FIG. 4 illustrates exemplary alphanumeric characters at a second stage of processing;

FIG. 16 illustrates by schematic diagram an example of a center pixel and neighboring pixels in conjunction with the exemplary process illustrated in FIG. 15;

FIG. 17A illustrates an exemplary alphanumeric character prior to processing by the exemplary process of FIG. 15;

FIG. 17B illustrates the exemplary alphanumeric character illustrated in FIG. 17A following processing by a configuration of the exemplary process of FIG. 15;

FIG. 17C illustrates the exemplary alphanumeric character illustrated in FIG. 17A following processing by another configuration of the exemplary process of FIG. 15;

FIG. 17D illustrates the exemplary alphanumeric character illustrated in FIG. 17A following processing by a third configuration of the exemplary process of FIG. 15;

Figure 1:
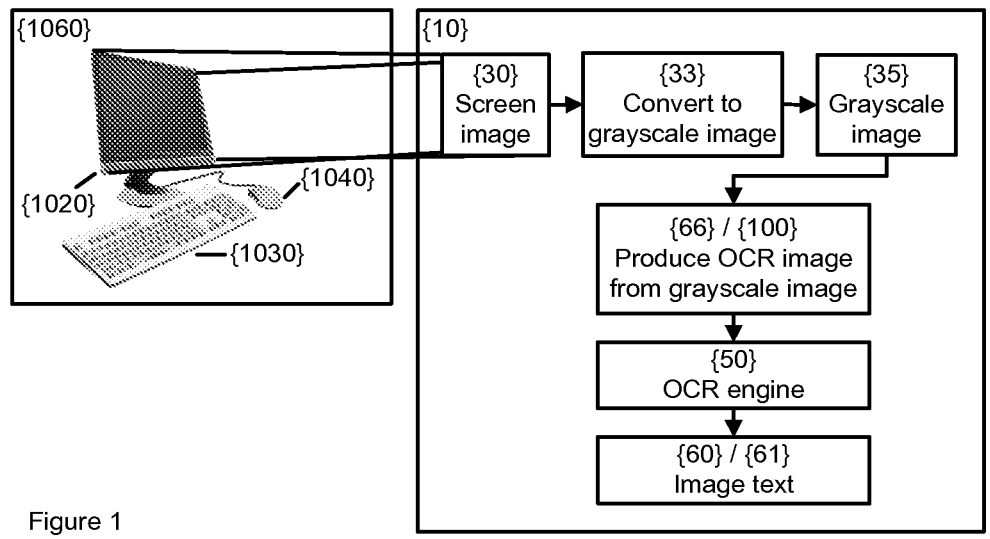
FIG. 1 illustrates by a combination of schematic diagram and process flow chart an exemplary implementation of a method for processing screen images.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof.

DETAILED DESCRIPTION OF THE INVENTION

Computer implemented methods for processing screen images that may include the visual content of one or more computer screens and that may include one or more alphanumeric characters, as well as related systems and compositions of matter are disclosed herein. The methods, systems, and compositions of matter disclosed herein may allow for monitoring the use of a computer by a user, including visual content that is displayed upon a computer screen of the computer to the user and textual information in the form of alphanumeric characters included within the visual content.

Computer includes, for example, a terminal that may have a computer screen, keyboard, and mouse, and is linked by network to a server with processing occurring generally on the server. In such an aspect, software, including that disclosed herein, may execute on the one or more processors in the server, and the computer provides an input/output interface from the server to the user. Computer further includes, for example, a digital computer with one or more processors, memory, computer screen(s), mouse, keyboard, storage device(s), and so forth on board. Computer further includes, for example, digital computers such as single-processor or multiprocessor computers, minicomputers, mainframe computers, as well as personal computers. Computer further includes, for example, hand-held computing devices, cellular telephones that include a microprocessor, and microprocessor-based or programmable consumer electronics.

Computer screen includes one or more visual displays in communication with the computer that may be generally viewed by a user of the computer. The computer screen may be a physical visual display(s), a virtual computer screen, or combination thereof, in various aspects.

The methods disclosed herein may be implemented in the form of software executable by computer, implemented in logic circuits and/or other hardware, or combinations thereof. In various aspects, the software includes computer readable instructions that, when executed, cause the computer to perform the steps of the methods.

The compositions of matter disclosed herein include computer readable media. Computer readable media includes media that may be accessed by the computer including volatile media, non-volatile media, removable media, and non-removable media. For example, computer-readable media includes computer storage media and communication media. Computer readable media includes volatile media, non-volatile media, removable media, and non-removable media implemented in any method or technology for storage of information such as computer-readable instructions, data structures, program modules or other data. Computer readable media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium that can be used to store the information and that can be accessed by the computer.

An exemplary method 10 for the extraction of image text 60 from a screen image 30 of the visual content displayed upon computer screen 1020 is generally illustrated in FIG. 1. As illustrated in FIG. 1, method 10 captures at least portions of the visual content displayed upon computer screen 1020 at a particular instant in time as screen image 30. The screen image 30 may be in various formats such as jpeg, tiff, as so forth. Screen image 30 may include image text 60, which is textual information embedded within the screen image and encoded in the format of the screen image 30. The screen image 30 may be a two-dimensional array of pixel values of the pixels or may be in various formats such as jpeg, tiff, etc.

The screen image 30 may include visual content displayed upon the entire computer screen 1020 or portions of the computer screen 1020. In some aspects, the screen image 30 may include only visual content viewable by the user at the moment the screen image 30 is captured and would not include, for example, portions of windows and/or other objects obscured by other windows and/or objects.

In other aspects, the screen image 30 may include at least portions all of the windows and other objects displayable within computer screen 1020 at the moment the screen image 30 is captured even though, as viewed at that moment by the user, one window or object obscures all or part of another window or object. The obscured portion of the window or object is captured in the screen image 30 in such aspects.

In still other aspects, the screen image 30 includes all the windows and other objects including those portions that lie outside the viewable portions of the computer screen 1020 but that may be viewed by a user by scrolling, resizing window(s), moving portions thereof into the viewable portion of the computer screen 1020, or otherwise manipulating the windows and other objects into view.

Screen image 30 may be a color image having multiple colors as displayed by computer screen 1020. At step 33, method 10 converts screen image 30 from a color image into grayscale image 35. Grayscale includes any representation whether black-gray-white or some other color or combination of colors generally having a linear shading scale. The grayscale values in this exemplary implementation range from 0 to 255, with 0 being white and 255 being black. This may be reversed in other implementations, such that 0 is black and 255 is white. In still other implementations, the shading may be of various gradations of some other color(s) such as, for example, blue. The shading may include various combinations of colors (for example, red to orange to yellow) in some implementations with the shading between colors progressing in a linear fashion. In the exemplary implementations presented herein, white is generally equated with light, black with dark, and lighter and darker refer to the progression from black to white and from white to black, respectively, the terms light, dark, lighter, and darker may be reversed or otherwise defined in various other implementations, as would be recognized by those of ordinary skill in the art upon study of this disclosure. The grayscale values have an 8-bit representation in this implementation, but other numbers of bits may be used to represent the grayscale values in various other implementations.

Grayscale image 35 is generally at the resolution of the computer screen 1020, and, thus, alphanumeric characters imbedded within grayscale image 35 may not be of sufficient quality for recognition by an OCR engine 50. At step 66, which is also designated as method 100, method 10 converts grayscale image 35 into an OCR image 40 of sufficient quality that OCR engine 50 can generally recognize alphanumeric characters imbedded within the OCR image 40.

As illustrated, the OCR image 40 is input into the OCR engine 50, and OCR engine 50 recognizes alphanumeric characters within the OCR image 40. Image text 60 is extracted from the OCR image 40 by the OCR engine 50 in method 10. Image text 60 is collected into image text file 61, and image text file 61 may be further processed in various ways, for example, to determine the content thereof, in various implementations. In various implementations, the OCR engine may be a commercially available OCR product such as OmniPage®, SimpleOCR®, Tesseract®, or Abby FineReader®.

Figure 2:
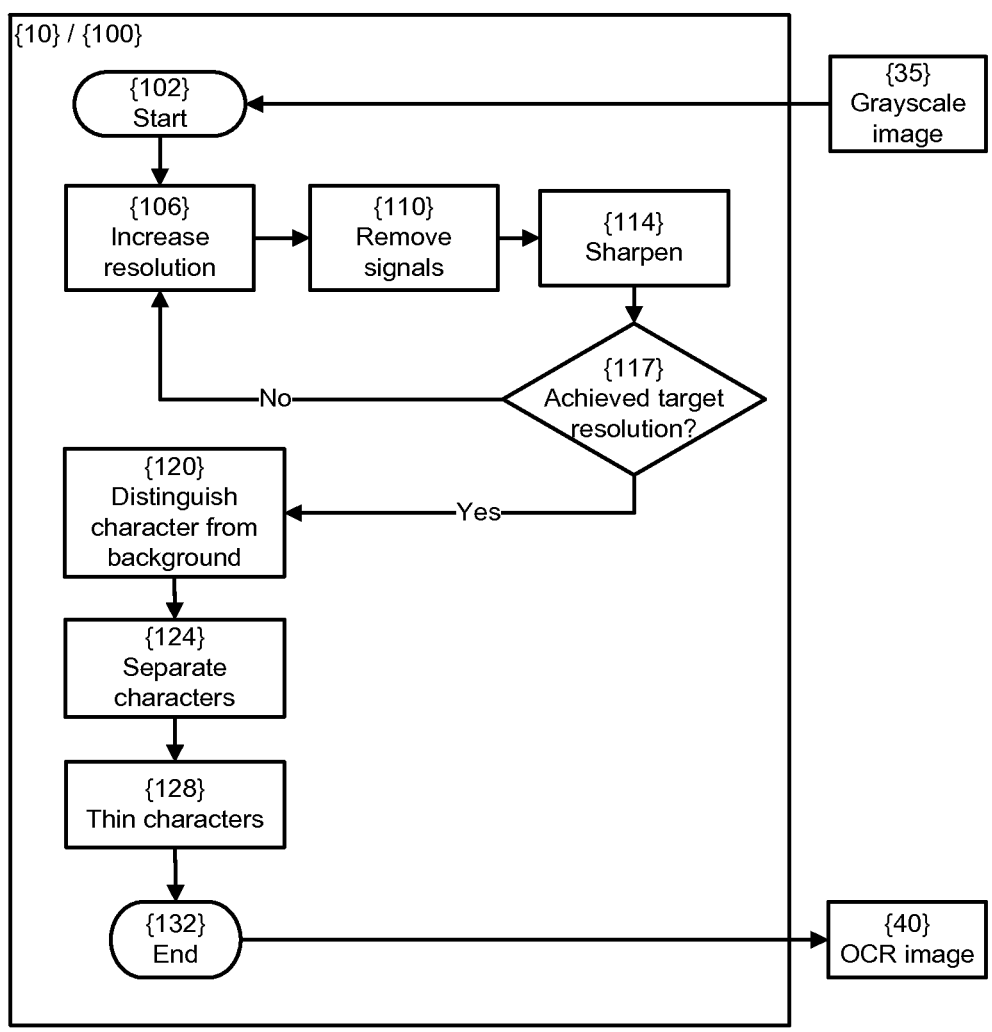
FIG. 2 illustrates by process flow chart portions of the exemplary method of FIG. 1.

FIG. 2 illustrates an implementation of method 100, which forms a portion of method 10. As illustrated in FIG. 2, grayscale image 35 is input into method 100 and grayscale image 35, including any alphanumeric characters therein, is converted by method 100 into OCR image 40. The OCR image 40 produced by method 100 may be input into OCR engine 50.

Grayscale image 35, and thus any alphanumeric characters embedded therein, as formed at step 33 of method 10 is generally at the resolution of the computer screen 1020. In some implementations, the resolution of the computer screen 1020 and, hence, grayscale image 35 is about 72 dots per inch (dpi). In other implementations, the computer screen 1020 may have other resolutions, so that grayscale image 35 and any alphanumeric characters embedded therein may correspondingly have resolutions greater than or less than about 72 dpi. In general, in order to be recognized by the OCR engine 50, alphanumeric characters should have a resolution of at least about 200 dpi to about 300 dpi or more. Accordingly, as grayscale image 35 is transformed into OCR image 40, the resolution is increased from that in the grayscale image 35 as captured from computer screen 1020 to a resolution in the OCR image 40 suitable for character recognition by OCR engine 50. For example, the resolution of OCR image 40 and, thus, of any alphanumeric characters embedded in OCR image 40 is generally in the range of from about 200 dpi to about 300 dpi or more in various implementations.

In order to transform the grayscale image 35 into the OCR image 40, method 100 increases the resolution of at least a portion of grayscale image 35 that includes alphanumeric characters 311 from a resolution of, for example, about 72 dpi to a resolution within the range of from about 200 dpi to about 300 dpi or more in the OCR image 40 using a plurality of increases in the resolution of the grayscale image 35. Following each increase in resolution, one or more filters are applied to the grayscale image 35 to remove short wavelength signals and/or long wavelength signals that may be in the form of errant pixels, non-relevant pixels, or other noise, and anti-aliasing is applied to sharpen the image. The process of applying one or more filters plus anti-aliasing to grayscale image 35 and increasing the resolution of grayscale image 35 may be repeated in various combinations until the grayscale image 35 is transformed into OCR image 40 having the desired resolution. Note that generally as described herein, grayscale image 35 may be as originally formed at step 33 of method 10 or may be as altered by application of the various methods or steps of the various methods presented herein. Various scratch image files and other intermediate image files may be generally associated with grayscale image 35 during transformation of grayscale image 35 into OCR image 40, as would be recognized by those of ordinary skill in the art upon study of this disclosure.

As illustrated in FIG. 2, method 10 initiates at step 102 and grayscale image 35, which is generally at the resolution of computer screen 1020, is input into method 100. At step 106, the resolution of the grayscale image 35 in dpi is increased. Method 100 proceeds from step 106 to step 110, and, at step 110, one or more filters are applied to the grayscale image 35 to remove signals that may be introduced by the increase in resolution at step 106. At step 114, the grayscale image 35 is sharpened by application of anti-aliasing. Method 100 loops from step 114 back to step 106, and the resolution of grayscale image 35 is again increased at step 106 and method 100 proceeds from step 106 to step 110 and then to step 114. Loop 117 is executed until the resolution of grayscale image 35 has been increased to the resolution desired in the OCR image 40. Loop 117 may be executed once or multiple times in various implementations depending upon, for example, the resolution of the grayscale image 35 as input into method 100 and the resolution desired in the OCR image 40. Steps 106, 110, 114 may appear in various orders in various implementations. For example, steps 106 and 110 may be interchanged so that the grayscale image 35 is filtered (step 110) prior to the increase in resolution (step 106). As a further example, step 110 and step 114 may be organized in various ways so that the grayscale image 35 is sharpened prior to filtering (i.e. step 114 is prior to step 110) or that the grayscale image 35 is subject to multiple steps 114 and 110 in various sequences. The pattern of the application of steps 106, 110, 114 may be altered as the resolution of the grayscale image is increased in various implementations.

Method 100 falls out of loop 117 and passes from step 114 to step 120. At step 120, grayscale image 35 is processed to distinguish alphanumeric characters from the image background. At step 124, the separation between alphanumeric characters is enhanced by, for example, the removal of pixels that bridge between alphanumeric characters. At step 128, alphanumeric characters are thinned. Method 100 terminates at step 132, at which the grayscale image 35 has been transformed into OCR image 40, and the OCR image 40 is output from method 100.

Figure 7:
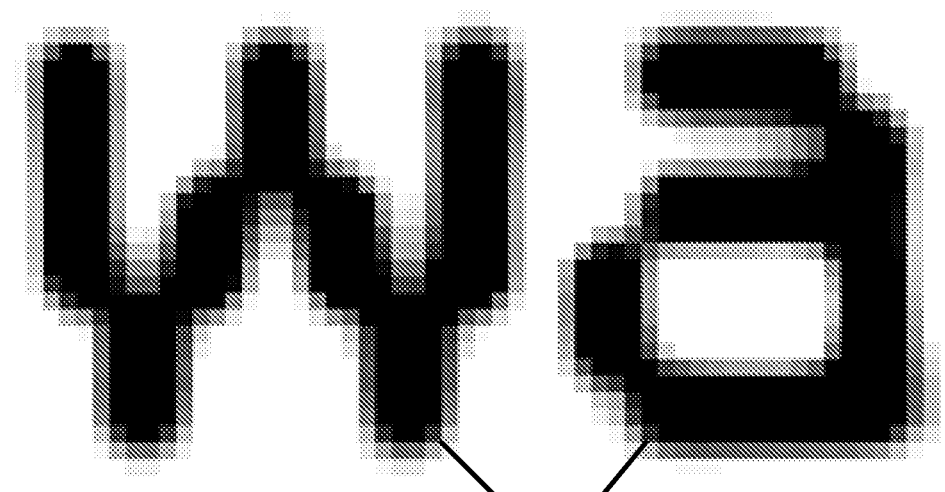
FIG. 7 illustrates exemplary alphanumeric characters at a fifth stage of processing.
Figure 8:
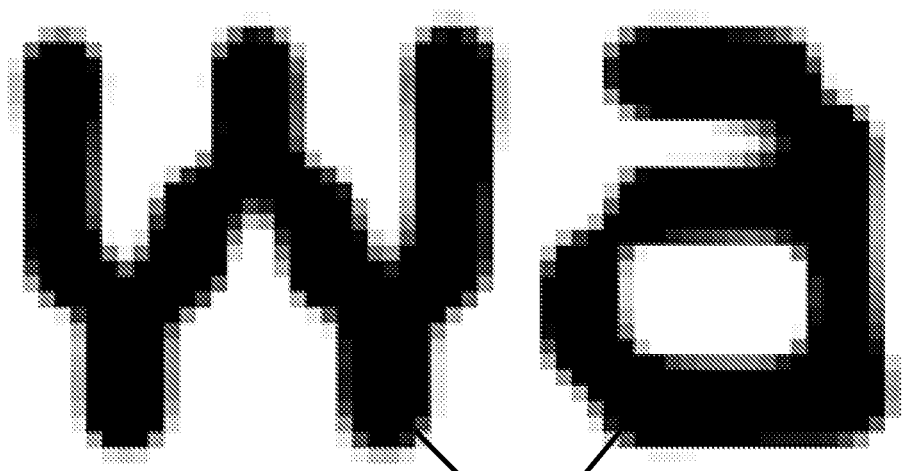
FIG. 8 illustrates exemplary alphanumeric characters at a sixth stage of processing.
Figure 9:
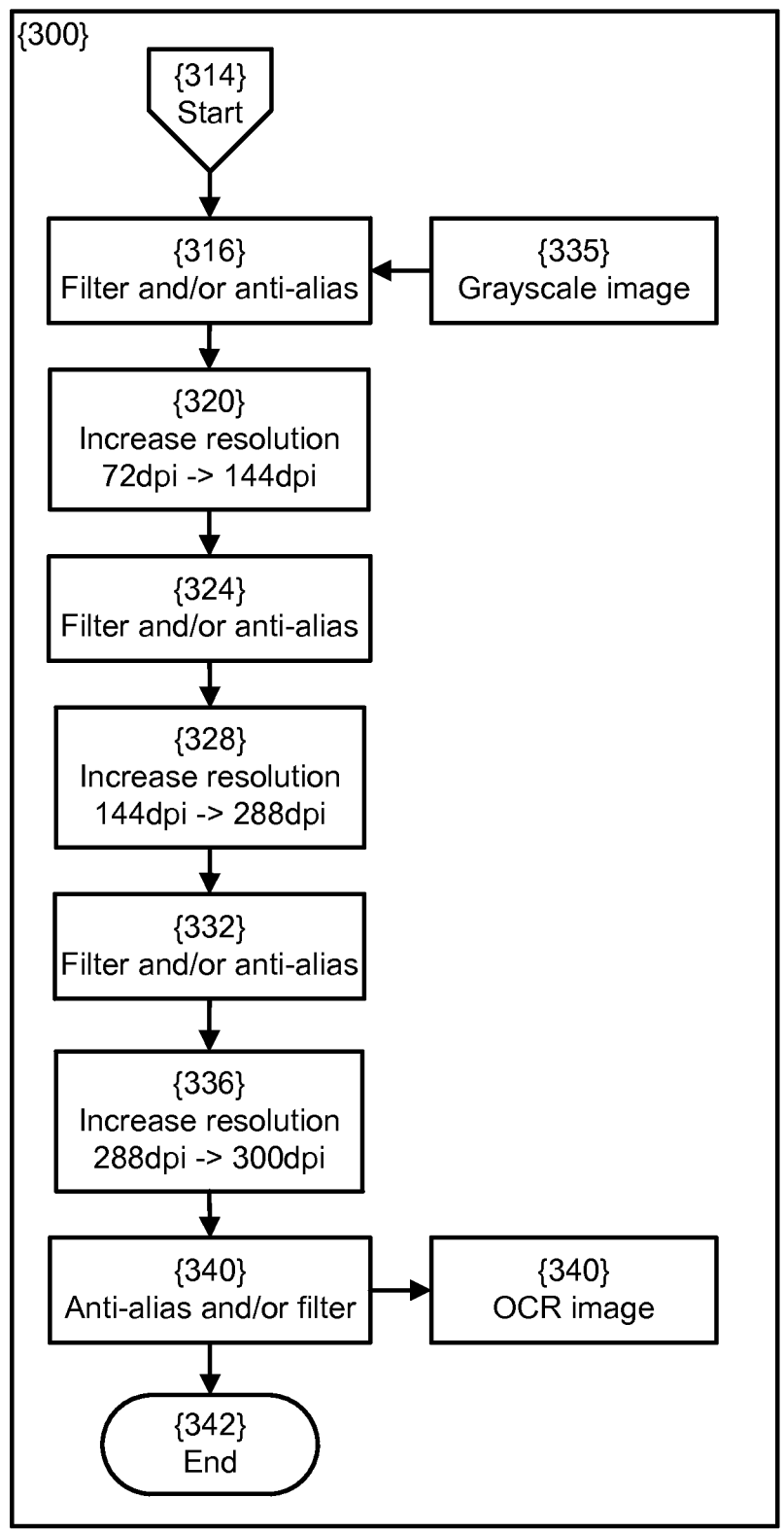
FIG. 9 illustrates by process flow chart a method for processing screen images containing one or more alphanumeric characters.

As another illustrative implementation, method 300, which is generally illustrated by flowchart in FIG. 9, transforms grayscale image 335 into OCR image 340. Grayscale image 335 may include alphanumeric characters at the native resolution of a computer display such as computer screen 1020. FIG. 3 illustrates alphanumeric characters 311 as the alphanumeric characters appear in grayscale image 355 as captured from the computer display, and FIGS. 4 to 8 illustrates alphanumeric characters 313, 317, 319, 321, 323 that are formed from alphanumeric characters 311 at various stages of transforming grayscale image 335 into OCR image 40 by method 300. It should be recognized that the specific processes, the order of the processes, and the values used in the process as set forth in this discussion of method 300 as well as generally throughout this disclosure are exemplary only and are not to be considered as limiting.

Alphanumeric characters 311 illustrated in FIG. 3 were generated by a standard Windows Explorer® application at 72 dpi on a 1600 by 1200 pixel display in 24-bit true-color mode and were converted into grayscale image 335, which is an 8-bit grayscale image. Accordingly, alphanumeric characters 311 are initially at a resolution of 72 dpi in grayscale image 335 as grayscale image 335 is input into method 300.

Alphanumeric characters 311 are in the default Windows screen font, which may be used for more than 70 percent of the text appearing on computer screen 1020. Alphanumeric characters 311 are formed with a san-serif font that is a narrow single-pixel font with significant aliasing and single-pixel spacing between characters, as illustrated in FIG. 3, which may present a challenge to the OCR engine's 50 ability to accurately process alphanumeric characters 311. In other implementations, the computer screen 1020 may have other resolutions, so that the alphanumeric characters displayed thereupon, and hence, alphanumeric characters in grayscale image 335 may have resolutions greater than or less than about 72 dpi and may be formed of various fonts, font styles (i.e. bold, italic, and so forth), and combinations thereof.

As illustrated in FIG. 9, method 300 is entered at step 314 and grayscale image 335 is input into method 300. At step 316 of method 300, a filter in the form of a Gaussian blur using a 0.3-pixel radius is applied to a portion of grayscale image 335 that includes alphanumeric characters 311 (FIG. 3) to produce alphanumeric characters 313 illustrated in FIG. 4.

At step 320, the resolution of alphanumeric characters 313 is doubled from 72 dpi to 144 dpi using bi-cubic interpolation.

Figure 5:
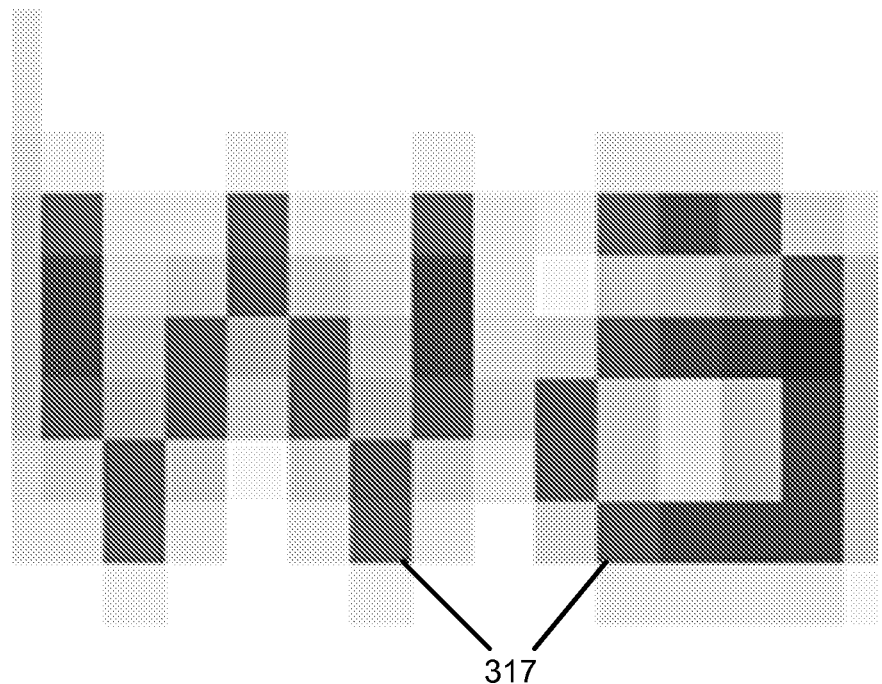
FIG. 5 illustrates exemplary alphanumeric characters at a third stage of processing.
Figure 6:
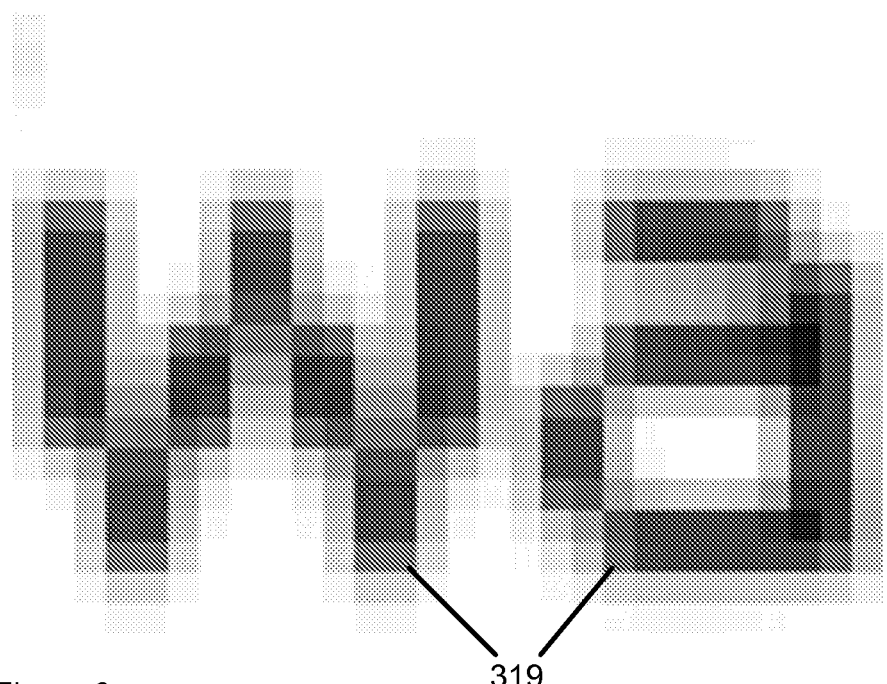
FIG. 6 illustrates exemplary alphanumeric characters at a fourth stage of processing.

At step 324, anti-aliasing is applied. The resulting alphanumeric characters 317 are illustrated in FIG. 5. Then, an un-sharp mask is applied to alphanumeric characters 317 with a mask opaqueness of 240 percent, a radius of 3.7 pixels, and a threshold of 9 levels followed by a Gaussian blur with a radius of 0.6 pixels. The resulting alphanumeric characters 319 are illustrated in FIG. 6.

At step 328, the resolution of the alphanumeric characters 319 is doubled from 144 dpi to 288 dpi using bi-cubic interpolation.

Anti-aliasing is applied following the bi-cubic interpolation, and then a 223-percent un-sharp mask with a 7.6-pixel radius using 9 levels is applied at step 332. The resulting alphanumeric characters 321 are illustrated in FIG. 7.

Alphanumeric characters 321 are then resolved from a resolution of 288 dpi to a resolution of 300 dpi using bi-cubic interpolation at step 336.

At step 340, anti-aliasing, Gaussian blur using a radius of 0.6 pixels, an un-sharp mask with a mask opaqueness of 204 percent, a radius of 4.8 pixels, and a threshold of 8 levels, and another Gaussian blur using a radius of 0.6 pixels are applied sequentially. Grayscale image 335 is now transformed into OCR image 340, which is output from method 300, and method 300 terminates at step 342. The resulting alphanumeric characters 323 as found in the OCR image 340 are illustrated in FIG. 8.

In various implementations, alphanumeric characters such as alphanumeric character 323 may be distinguished from the background by application of a sliding window 355 (FIG. 10B) as part of the transformation of the grayscale image 35 into OCR image 40. The sliding window 355 may be applied to the grayscale image, such as grayscale image 35, 335, at various stages of the transformation of the grayscale image into the OCR image, such as OCR image 40, 340. For example, the sliding window 335 may be applied to grayscale image 35 at step 120 of method 100 or the sliding window may be applied to the grayscale image 335 between step 316 and step 320 of method 300. The application of the sliding window 355 may improve the distinction between the alphanumeric characters (black in this example) and the background (white in this example), meaningful pixels may be darkened (i.e. made to more closely conform to the shade of the alphanumeric character), and less-meaningful pixels may be lightened (i.e. made to more closely conform to the shade of the background). Noise pixels created by the Gaussian blurring, un-sharp mask, and anti-aliasing operations may be eliminated (generally changed into the background shade) by application of the sliding window.

Figure 10A:
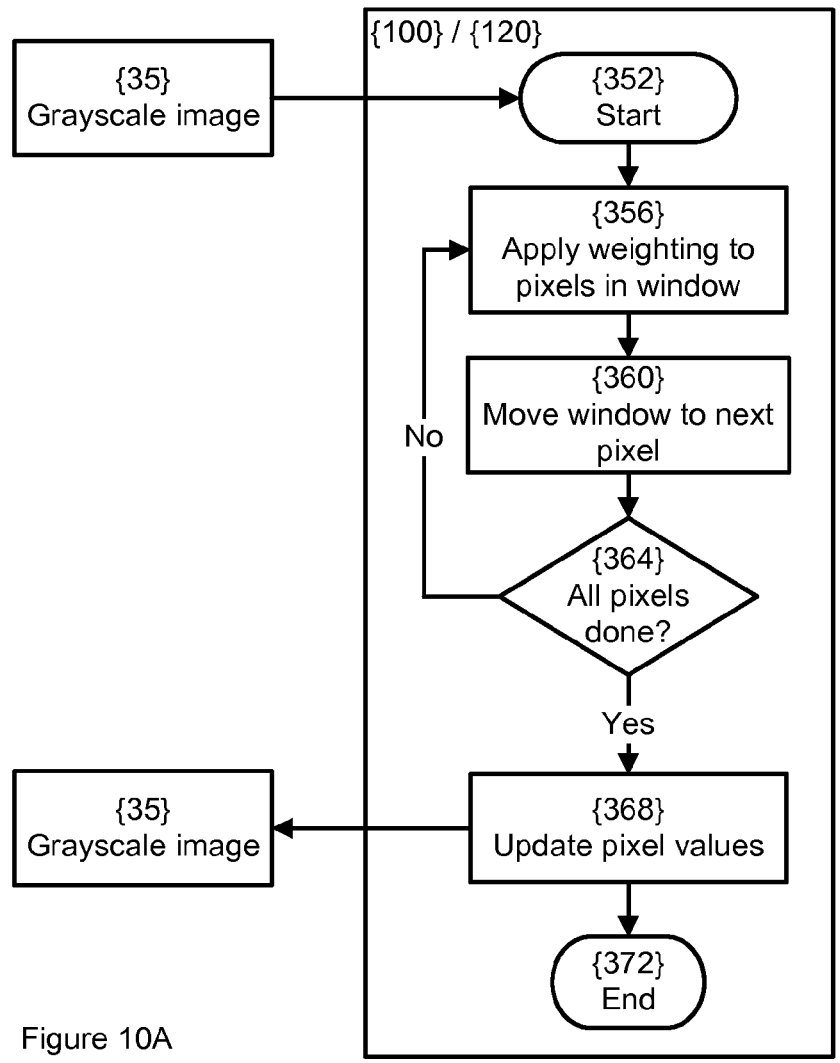
FIG. 10A illustrates by process flow chart portions of the exemplary method of FIG. 2.
Figure 10B:
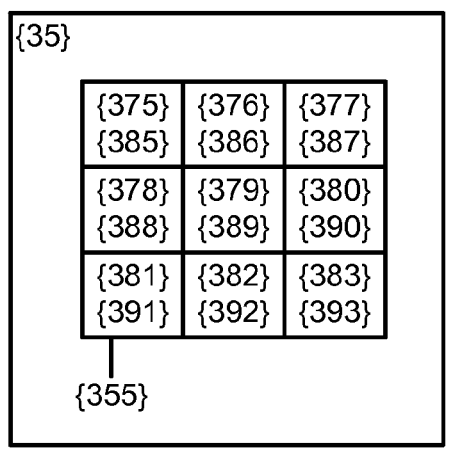
FIG. 10B illustrates by schematic diagram an exemplary sliding window.

The sliding window 355 is generally illustrated in FIG. 10B. The sliding window 355 is a virtual construct, and represents a grouping of pixels such as pixels 375-383 for the purpose of adjusting the pixel values of the pixels in the grouping of pixels. As illustrated in FIG. 10B, the sliding window 355 is applied to grayscale image 35 such that cells 385-393 of sliding window align with pixels 375-383, respectively of grayscale image 35. In this implementation, sliding window 355 has a rectangular geometric shape, and the width and height of the sliding window 355 are 3 cells×3 cells, respectively. The dimensions of the sliding window 355 may be greater than or less than 3 cells×3 cells, the dimensions may be adjustable, and/or the sliding window may assume various geometric shapes, in various implementations.

The application of sliding window 355 to grayscale image 35 at step 120 of method 100 is illustrated by flow chart in FIG. 10A. Step 120 begins at step 352 and grayscale image 35 is input into step 120. At step 356, pixel values of pixels 375-383 in the sliding window 355 are distributed by a weighting scheme to their byte-wise extremes. The pixel of pixels 375-383 having the lowest pixel value is assigned a pixel value of 0. For example, assume pixel 375 has the lowest pixel value from amongst pixels 375-383. Pixel 375 is then assigned a pixel value of 0. The pixel of pixels 375-383 with the highest pixel value is assigned a pixel value of 255. Continuing the example, assume that pixel 381 has the highest pixel value from amongst pixels 375-383. Pixel 381 is then assigned a pixel value of 255. The remaining pixels of pixels 375-383, which would be pixels 376-380, 382, 383 per the example, are assigned pixel values based on the relationship with the high pixel value prior to reassignment of the high pixel value to 255 and the low pixel value prior to reassignment of the low pixel value to 0 recalculated to a range of 0 to 255. The sliding window 355 is then shifted to another pixel in grayscale image 35 at step 360. For example, the sliding window may be shifted so that cell 389 is aligned with pixel 380 and, thus, cell 385 is aligned with pixel 376, cell 391 is aligned with pixel 382, and so forth. Steps 356 and steps 360 are repeated in this implementation until the weighting step 356 has been applied to all pixels within digital image 35. The pixels are then updated at step 368 to the values assigned at steps 356. Per the example in this paragraph, the pixel value of pixel 375 is set to 0 at step 368 and the pixel value of pixel 381 is set to 255 at step 368. Accordingly, the comparisons between pixel values at step 356 are between the unadjusted pixel values. The adjustments to the pixel values are accumulated as the loop between steps 356, 360, 264 is executed, and the adjustments are then applied at step 368. Grayscale image 35 with the pixels adjusted by the application of the sliding window 355 is then output at step 372 and step 120 of method 100 terminates.

As the resolution of the grayscale image, such as grayscale image 35, 335, is increased to the resolution of the OCR image, such as OCR image 40, 340 by, for example, steps 106, 110, 114, alphanumeric characters embedded within the grayscale image may touch one another through expansion of the thickness of the alphanumeric characters and/or the formation of bridge pixels between the alphanumeric characters. The OCR engine, such as OCR engine 50, may inaccurately interpret such alphanumeric characters that touch on another. For example, the OCR engine may mistake the combination of letters 'vv' for the letter 'w', the combination of letters 'nn' for the letter 'm', the combination of letters 'ol' for the letter 'd', the combination of letters 'lo' for the letter 'b', and so forth. Accordingly, in forming the OCR image, the grayscale image may be processed, for example at step 124 of method 100, to separate alphanumeric characters from one another by eliminating bridge pixels and other touching between alphanumeric characters in order to increase the accuracy of the recognition of the alphanumeric characters by the OCR engine.

Figure 11:
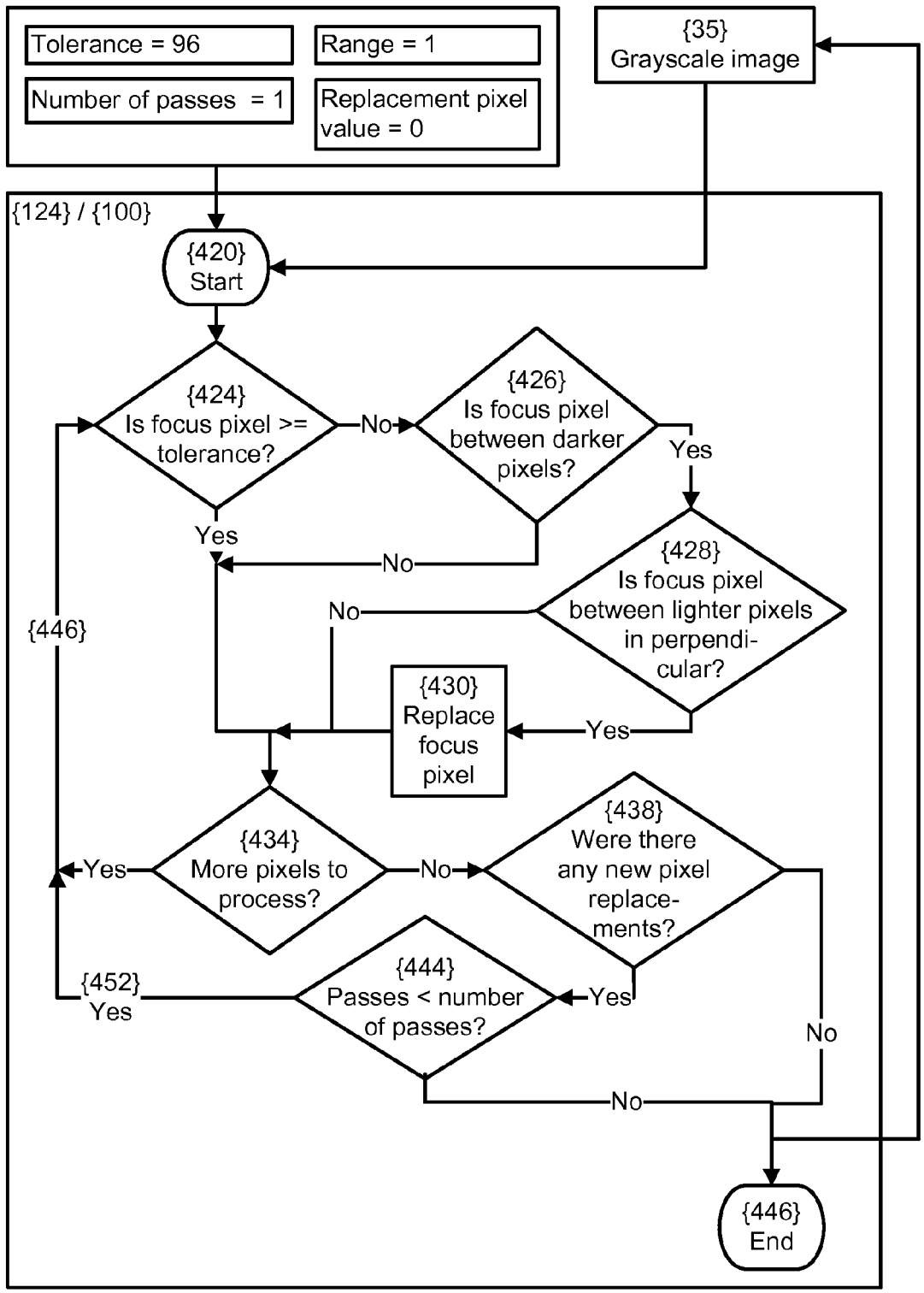
FIG. 11 illustrates by process flow chart portions of the exemplary method of FIG. 2.
Figures 12A, 12B, 12C, 12D, 13:
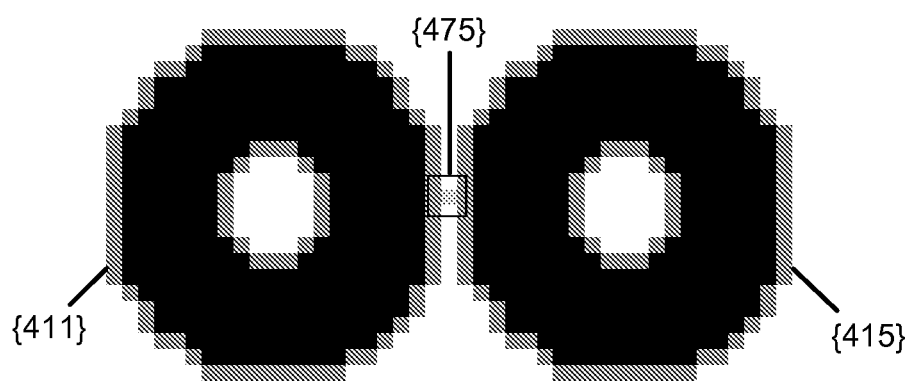
FIG. 12A illustrates by schematic diagram an example of a focus pixel and pixels within a range of one of the focus pixel having a combination of pixel values that satisfies steps 424, 426, 428 of the process illustrated in FIG. 11.
FIG. 12B illustrates by schematic diagram another example of a focus pixel and pixels within a range of one of the focus pixel having a combination of pixel values that satisfies steps 424, 426, 428 of the process illustrated in FIG. 11.
FIG. 12C illustrates by schematic diagram a third example of a focus pixel and pixels within a range of one of the focus pixel having a combination of pixel values that satisfies steps 424, 426, 428 of the process illustrated in FIG. 11.
FIG. 12D illustrates by schematic diagram a fourth example of a focus pixel and pixels within a range of one of the focus pixel having a combination of pixel values that satisfies steps 424, 426, 428 of the process illustrated in FIG. 11.
FIG. 13 illustrates an example of a bridge between two alphanumeric characters.

An implementation of step 124 of method 100 for separating alphanumeric characters is generally illustrated by flow chart in FIG. 11. Step 124 attempts to separate alphanumeric characters by identifying and eliminating pixel(s) that may be bridging two alphanumeric characters. For example, as illustrated in FIG. 13, pixel 475 is a bridge pixel as pixel 475 forms a bridge that links alphanumeric character 411 to alphanumeric character 415, and step 124 attempts to eliminate pixel 475 by altering the color of pixel 465 generally to the background shade, which in this example, is white. In other implementations, for example, the alphanumeric characters may be generally white and the background gray or black so that the bridge pixel may be generally white and would then be altered to the background shade—gray or black. In general, bridge pixel(s) may generally deviate from the background shade and may generally approach the shade of the alphanumeric characters such as alphanumeric characters 411, 415. Bridge pixel(s) are identified in step 124 and the shade of the bridge pixel(s) altered to conform generally to the background shade, in various implementations.

As illustrated in FIG. 11, step 124 of method 100 begins at step 420 and grayscale image 35 as processed by steps 106, 110, 114, 120 of method 100 is input into step 124. Four parameters are passed into step 124. These four parameters are:

tolerance value—pixels with pixel values that are darker than the tolerance value will not be replaced in step 124.

pixel range—when testing whether a focus pixel is between two darker pixels in any direction the pixel range is the number of pixels in any direction from the focus pixel that are examined to find a darker pixel. In effect, the pixel range is the desired number of pixels of separation between characters.

number of passes—multiple passes help resolve an issue where a pixel bridge is formed of multiple pixels. For example, one or more of the bridge pixels is darker than the other bridge pixels, which causes one or more of the darker pixel's neighbors to fail the test requiring the pixels on the perpendicular side to be the same or lighter in color. The first pass will eliminate the darker bridge pixel, allowing the lighter bridge pixels to be detected on subsequent passes.

replacement pixel value that replaces the pixel value of the focus pixel.

As illustrated in FIG. 11, the tolerance value is set to 96 (medium-light gray); the range is set to one pixel; the number of passes is set equal to one; and the replacement pixel value is set to the background shade of white (0).

As illustrated in FIG. 11, step 124 proceeds from step 420 to step 424. The pixel value of focus pixel 475, which is a pixel in grayscale image 35 as previously processed by steps 106, 110, 114, 120 of method 100, is compared with the tolerance value at step 424. If the pixel value of focus pixel 475 is greater than or equal to the tolerance value (i.e. if the focus pixel 475 is as dark or darker than the tolerance value) then step 124 proceeds from step 424 to step 434 and no further processing of focus pixel 475 occurs during this pass. If the pixel value of focus pixel 475 is less than the tolerance value (i.e. if the focus pixel 475 is lighter than the tolerance value) then step 124 proceeds from step 424 to step 426. At step 426, pixels 471-474, 476-479 (see FIGS. 12A-12D) that lie within a distance of the pixel range (one pixel in this example) in any direction from focus pixel 475 are examined to determine if focus pixel 475 lies between darker pixels along the horizontal axis, vertical axis, or either of the diagonal axes, respectively.

If the focus pixel 475 does not lie between darker pixels along the horizontal axis, vertical axis, or either of the diagonal axes, control passes from step 426 to step 434 and no further processing of focus pixel 475 occurs during this pass. If the focus pixel 475 lies between darker pixels along the horizontal axis, vertical axis, or either of the diagonal axes, control passes from step 426 to step 428.

At step 428 the pixels along an axis perpendicular to the axis along which the darker pixels were found at step 426 are examined to determine if the focus pixel 475 lies between pixels as light or lighter than the focus pixel along this perpendicular axis. If the focus pixel 475 does not lie between pixels as light or lighter than the focus pixel 475 along this perpendicular axis, control passes to step 434. If the focus pixel 475 lies between pixels as light or lighter than the focus pixel 475 along this perpendicular axis, control passes to step 430 where the pixel value of the focus pixel is designated for replacement by the replacement pixel value. Control passes from step 430 to step 434. Loop 446 is executed until all pixels within grayscale image 35 have been processed as the focus pixel. For example, upon the next pass through loop 446, pixel 476 may be designated as the focus pixel and so forth.

This methodology of steps 426, 428 is further illustrated in FIGS. 12A to 12D. FIGS. 12A to 12D illustrates focus pixel 475 with pixel range equal to one, so that focus pixel 475 is surrounded by pixels 471-474, 476-479. Accordingly, all pixels 471-474, 476-479 lying within a distance of one pixel (the pixel range) in any direction from focus pixel 475 are examined in step 124. In other implementations, all pixels within the pixel range, which may be greater than one pixel, are examined. Pixels 471-474, 476-479 may be have various combinations of pixel values less than focus pixel 475, equal to focus pixel 475, or greater than focus pixel 475 so as to be lighter than focus pixel 475, of equal lightness, or darker than focus pixel 475, respectively. Possible combinations of the pixel values of pixels 471-474, 476-479 with respect to focus pixel 475 that satisfy the tests of steps 426, 428 are illustrated in FIGS. 12A to 12D.

As illustrated in FIG. 12A, the pixel value of pixel 475 is less than the pixel value of pixel 474 and the pixel value of pixel 475 is less than the pixel value of pixel 476. Thus, pixel 475 lies between darker pixels 474, 476 along the horizontal axis so that the test of step 426 is satisfied. The pixel value of pixel 475 is greater than or equal to the pixel value of pixel 472 and pixel 478. Pixels 472, 478 lie along the vertical axis, which is perpendicular to the horizontal axis along which the darker pixels were found. Thus, at illustrated, focus pixel 475 lies between pixels as light or lighter than the focus pixel 475 along the axis perpendicular to the axis along which the darker pixels lie. The condition of step 428 is therefore satisfied, and the pixel value of focus pixel 475 is designated for replacement with the replacement pixel value (=0 white) at step 430.

An example of the combination of the pixel values of pixels 471-474, 476-479 with respect to focus pixel 475 illustrated in FIG. 12A is illustrated in FIG. 13. As illustrated in FIG. 13, focus pixel 475 forms a bridge that links alphanumeric character 411 to alphanumeric character 415. Pixels 474, 476 (not shown) form portions of alphanumeric characters 411, 415, respectively. By replacement of the pixel value of focus pixel 475 in this example with the replacement pixel value, the bridge between formed by focus pixel 475 between alphanumeric character 411 and alphanumeric character 415 is eliminated.

Another combination of the pixel values of pixels 471-474, 476-479 with respect to focus pixel 475 that satisfies the tests of steps 426, 428 is illustrated in FIG. 12B. As illustrated in FIG. 12B, the pixel value of focus pixel 475 is less than the pixel value of pixel 472 and the pixel value of focus pixel 475 is less than the pixel value of pixel 478. Thus, focus pixel 475 lies between darker pixels 472, 478 along the vertical axis, so that the test of step 426 is satisfied. The pixel value of focus pixel 475 is greater than or equal to the pixel value of pixel 474, and pixel value of focus pixel 475 is greater than or equal to pixel 476. Pixels 474, 476 lie along the horizontal axis, which is perpendicular to the vertical axis along which darker pixels 472, 478 were found. Thus, at illustrated in FIG. 12B, focus pixel 475 lies between pixels as light or lighter than the focus pixel 475 along the horizontal axis, which is perpendicular to the vertical axis along which darker pixels 472, 478 lie. The condition of step 428 is therefore satisfied, and the pixel value of focus pixel 475 is designated for replacement with the replacement pixel value at step 430.

Another combination of the pixel values of pixels 471-474, 476-479 with respect to focus pixel 475 that satisfies the tests of steps 426, 428 is illustrated in FIG. 12C. As illustrated in FIG. 12C, the pixel value of pixel 475 is less than the pixel value of pixel 473 and the pixel value of pixel 475 is less than the pixel value of pixel 477. Thus, pixel 475 lies between darker pixels 473, 477 along a diagonal axis generally defined by pixels 473, 477, so that the test of step 426 is satisfied. The pixel value of pixel 475 is greater than or equal to the pixel value of pixel 471 and pixel 479. Pixels 471, 479 lie along a diagonal axis that is perpendicular to the diagonal axis along which darker pixels 473, 477 lie. Thus, at illustrated in FIG. 12C, focus pixel 475 lies between pixels 471, 479 that are as light or lighter than focus pixel 475 along the diagonal axis perpendicular to the diagonal axis along which darker pixels 473, 477 lie. The condition of step 428 is therefore satisfied, and the pixel value of focus pixel 475 is designated for replacement with the replacement pixel value at step 430.

As illustrated in FIG. 12D, the pixel value of pixel 475 is less than the pixel value of pixel 471 and the pixel value of pixel 475 is less than the pixel value of pixel 479. Thus, pixel 475 lies between darker pixels 471, 479 along a diagonal axis generally defined by pixels 471, 479, so that the test of step 426 is satisfied. The pixel value of pixel 475 is greater than or equal to the pixel value of pixel 473 and pixel 477. Pixels 473, 477 lie along a diagonal axis that is perpendicular to the diagonal axis along which darker pixels 471, 479 lie. Thus, at illustrated, focus pixel 475 lies between pixels 473, 477 that are as light or lighter than focus pixel 475 along the diagonal axis perpendicular to the diagonal axis along which darker pixels 471, 479 lie. The condition of step 428 is therefore satisfied, and the pixel value of focus pixel 475 is replaced with the replacement pixel value at step 430.

If the specified number of passes is greater than one, the number of passes through loop 452 is tracked and loop 452 is executed for either the number of passes (step 444) or until no additional pixels are designated for replacement with the replacement pixel value (step 438), whichever occurs first. Passes subsequent to the first pass through loop 452 only process pixels within the range value in distance from only those pixels whose values were replaced in previous passes.

Step 124 then falls out of loop 452 and terminates at step 446. Grayscale image 35 is output from step 124 as modified thereby, as illustrated.

Figure 14:
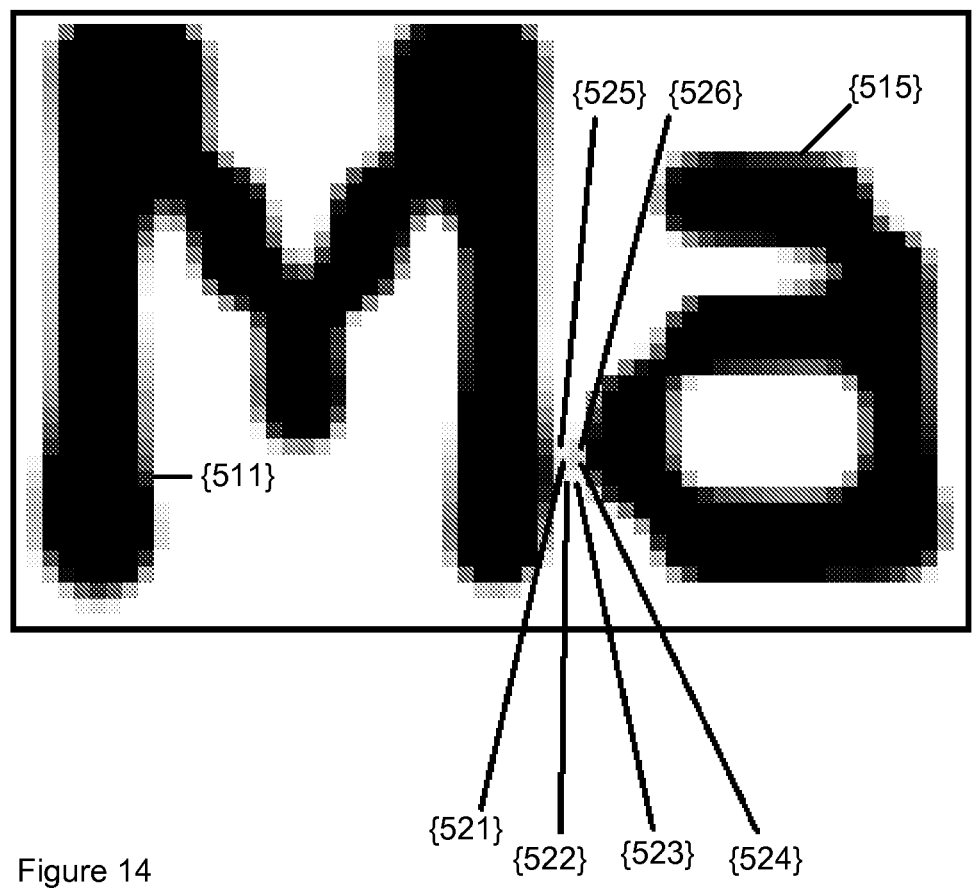
FIG. 14 illustrates another example of a bridge between two alphanumeric characters.

Setting the number of passes to a value greater than one may eliminate bridges formed from multiple pixels, as illustrated in FIG. 14. As illustrated in FIG. 14, alphanumeric character 511 is linked to alphanumeric character 515 by a bridge composed of pixels 521-526. Setting the number of passes to a value greater than one so that multiple passes through loop 452 are made may eliminate the bridge composed of pixels 521-526.

As the resolution of the grayscale image, such as grayscale image 35, 335, is increased to the resolution of the OCR image, such as OCR image 40, 340 by, for example, steps 106, 110, 114, line elements of the alphanumeric characters embedded within the grayscale image may become thicker. Accordingly, in forming the OCR image, the grayscale image may be processed, for example by character line element thickness reduction step 128 of method 100, to reduce the thickness of the line elements of the alphanumeric characters embedded within the grayscale image, which may increase the accuracy of alphanumeric character recognition by the OCR engine. Thickness, as used in this discussion of step 128, refers to the height and/or width of the lines forming the alphanumeric character, and thinning the alphanumeric character refers to reducing the height and/or width of the lines forming the alphanumeric character.

Figure 15:
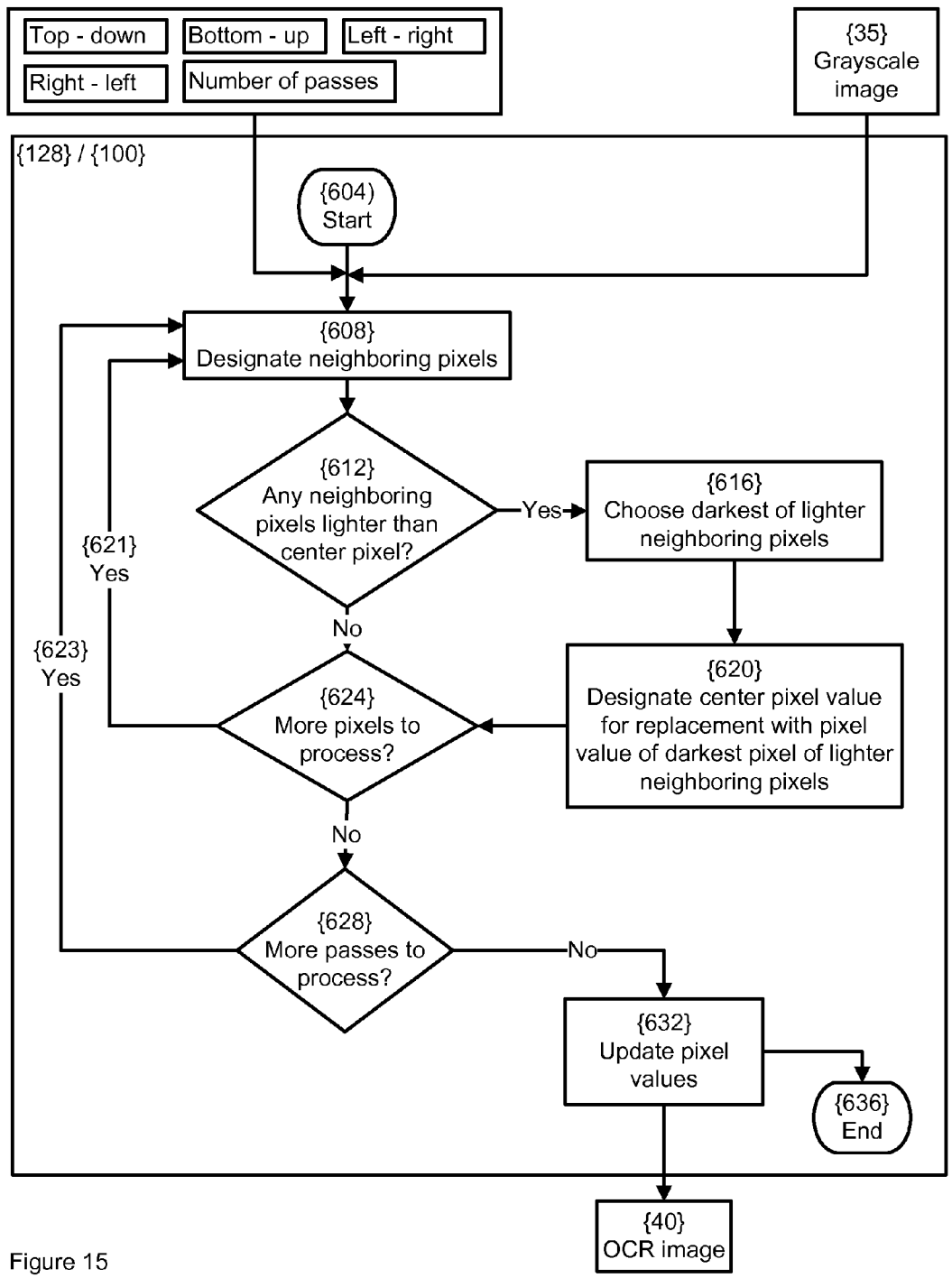
FIG. 15 illustrates by process flow chart portions of the exemplary method of FIG. 2.

An exemplary implementation of step 128 for thinning the alphanumeric character is illustrated by flow chart in FIG. 15. As illustrated, step 128 is entered at step 604, and grayscale image 35 as processed by previous steps of method 100 is input into step 128. Five variables are input into step 128: a left-right flag, a top down flag, a right-left flag, a bottom up flag, and a number of passes variable. The left-right flag, top down flag, right-left flag, and bottom up flag may be toggled between a true value and a false value. When assigned the value of true, the left-right flag is indicative of one-pixel left-to-right width reduction, the top-down flag is indicative of one-pixel top-down height reduction, the right-left flag is indicative of one-pixel right-to-left width reduction, and the bottom-up flag is indicative of one-pixel bottom-up height reduction. When assigned the value of false, the left-right flag is indicative of no left-to-right width reduction, the top-down flag is indicative of no top-down height reduction, the right-left flag is indicative of no right-to-left width reduction, and the bottom-up flag is indicative of no bottom-up height reduction.

The number of passes variable designates the number of loops through loop 623, which may effect the overall reduction in alphanumeric character thickness achieved by step 128. A single pass of the function can produce 0 to 2 pixels of width reduction and 0 to 2 pixels of height reduction, with the possibility of a half-pixel shift in the centerline of the original character on the vertical and/or horizontal axes. Accordingly, the thickness reduction of the alphanumeric characters (i.e. thinning) may be controlled by specifying the number of passes through loop 623.

At step 608, one or more of neighboring pixels 681, 682, 684, 685 to center pixel 683 (see FIG. 16) may be designated as indicated by the top-down flag, the left-right flag, the right-left flag, and the bottom-up flag, respectively. That is, if the top-down flag is set to the true value, pixel 681 is designated. If the left-right flag is set to the true value, pixel 682 is designated. If the right-left flag is set to the true value, pixel 684 is designated. If the bottom-up flag is set to the true value, pixel 685 is designated. If the top-down flag is set to the false value, pixel 681 is not designated. If the left-right flag is set to the false value, pixel 682 is not designated. If the right-left flag is set to the false value, pixel 684 is not designated. If the bottom-up flag is set to the false value, pixel 685 is not designated. Pixels on the diagonal from the center pixel 683 are not considered in this implementation of step 128.

At step 612 the pixel values of the pixel(s) designated at step 608 are compared to the pixel value of the center pixel 683 to determine if any of the pixel(s) designated at step 608 are lighter than center pixel 683. If no, step 128 proceeds from step 612 to step 624, which terminates loop 621. If one or more pixels pixel(s) designated at step 608 are lighter than center pixel 683, then step 128 proceeds from the test at step 612 to step 616. At step 616, the darkest of the pixel(s) designated at step 608 that are lighter than center pixel 683 is chosen. At step 620, the pixel value of center pixel 683 is designated for replacement by the pixel value of the darkest of the pixel(s) that are lighter than center pixel 683 chosen at step 616. Step 128 then proceeds from step 620 to step 624.

Loop 621 is executed until all pixels within grayscale image 35 have been processed by loop 621. Loop 621 is nested within loop 623, as illustrated in FIG. 15. Loop 623 is executed the number of times as specified by the number of passes variable input into step 128. At step 632, the pixel values of pixels within grayscale image 35 that were designated for replacement at step 620, if any, are replaced. Step 128 then terminates at step 636 and grayscale image 35 with the modifications of step 620 of step 128 is output from step 128 as OCR image 40.

Depending upon the true/false values assigned to the left-right flag, the top-down flag, the right-left flag, and the bottom-up flag, the following thickness reductions in the thickness of the alphanumeric characters and shifts in the center position of the alphanumeric characters may result:

One pixel of alphanumeric character width reduction, with a half-pixel alphanumeric character center shift to the right (left-right flag=true)

One pixel of alphanumeric character element height reduction, with a half-pixel alphanumeric character center shift down (top-down flag=true)

One pixel of alphanumeric character element width reduction, with a half-pixel alphanumeric character center shift to the left (right-left flag=true)

One pixel of alphanumeric character element height reduction, with a half-pixel alphanumeric character center shift up (bottom-up flag=true)

Two pixels of alphanumeric character element width reduction, no alphanumeric character center shift (left-right flag=true; right-left flag=true)

Two pixels of alphanumeric character element height reduction (no alphanumeric character center shift)—(top-down flag=true; bottom-up flag=true)

Figure 17E:
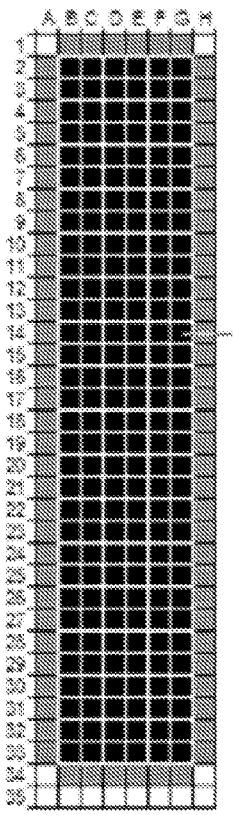
FIG. 17E illustrates the exemplary alphanumeric character illustrated in FIG. 17A following processing by a fourth configuration of the exemplary process of FIG. 15.

FIGS. 17A-17G illustrate application of step 128 of method 100 as illustrated in FIG. 15 to an alphanumeric character 670 wherein step 128 is configured using various combinations of values for the left-right flag, the top-down flag, the right-left flag, and the bottom-up flag. The alphanumeric character 670 is a lower-case letter 'l' (as in Lima) which is formed in Arial font as illustrated in FIG. 17A. The results of various configurations of step 128 obtained by variously setting the true/false values assigned to the left-right flag, the top-down flag, the right-left flag, and the bottom-up flag, are illustrated by reference to the alphanumeric character 670 in FIGS. 17B-17H.

FIG. 17B illustrates the effect of setting the left-right flag=true on alphanumeric character 670. As illustrated in FIG. 17B, pixels A-2 to A-34 are eliminated from the alphanumeric character 670, resulting in a one-pixel width reduction and a half-pixel shift to the right of the center of alphanumeric character 670.

FIG. 17C illustrates the effect of setting the top-down flag=true on alphanumeric character 670. As illustrated in FIG. 17C, pixels C-1, D-1, E-1, F-1, G-1 are eliminated from the alphanumeric character 670 resulting in a one pixel height reduction and a half-pixel downward shift of the center of alphanumeric character 670.

FIG. 17D illustrates the effect of setting the right-left flag=true on alphanumeric character 670. As illustrated in FIG. 17D, pixels H-2 to H-34 are eliminated from the alphanumeric character 670, resulting in a one-pixel width reduction and a half-pixel shift to the left of the center of alphanumeric character 670.

FIG. 17E illustrates the effect of setting the top-down flag=true on alphanumeric character 670. As illustrated in FIG. 17E, pixels C-35, D-35, E-35, F-35, G-35 are eliminated from the alphanumeric character 670 resulting in a one pixel height reduction and a half-pixel upward shift of the center of alphanumeric character 670.

Figure 17F:
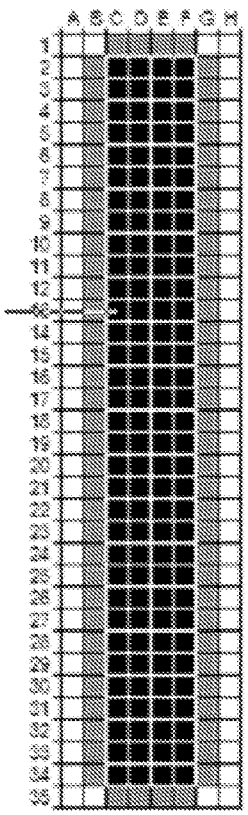
FIG. 17F illustrates the exemplary alphanumeric character illustrated in FIG. 17A following processing by a fifth configuration of the exemplary process of FIG. 15.

FIG. 17F illustrates the effect of setting the left-right flag=true and the right-left flag=true on alphanumeric character 670. As illustrated in FIG. 17F, pixels A-2 to A-34 and pixels H-2 to H-34 are eliminated from the alphanumeric character 670, resulting in a two pixel width reduction and no shift in the center of alphanumeric character 670.

Figure 17G:
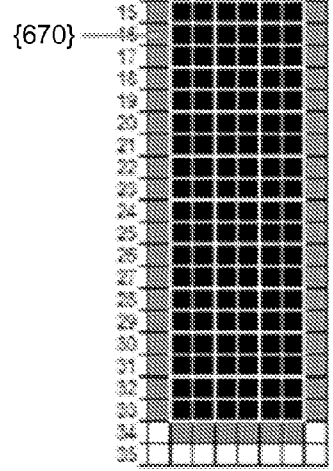
FIG. 17G illustrates the exemplary alphanumeric character illustrated in FIG. 17A following processing by a sixth configuration of the exemplary process of FIG. 15.

FIG. 17G illustrates the effect of setting the top-down flag=true and bottom-up flag=true on alphanumeric character 670. As illustrated in FIG. 17G, pixels C-1, D-1, E-1, F-1, G-1 and pixels C-35, D-35, E-35, F-35, G-35 are eliminated from the alphanumeric character 670 resulting in a two pixel height reduction and no shift in the center of alphanumeric character 670.

Figure 17H:
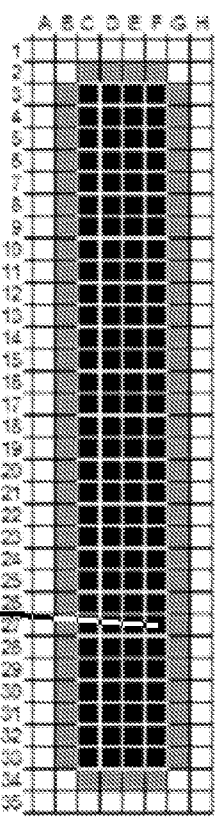
FIG. 17H illustrates the exemplary alphanumeric character illustrated in FIG. 17A following processing by a seventh configuration of the exemplary process of FIG. 15.

FIG. 17H illustrates the effect of setting the top-down flag=true, bottom-up flag=true, left-right flag=true, and right-left flag=true on alphanumeric character 670. As illustrated in FIG. 17H, pixels C-1, D-1, E-1, F-1, G-1, pixels C-35, D-35, E-35, F-35, G-35, pixels A-2 to A-34, and pixels H-2 to H-34 are eliminated from the alphanumeric character 670 resulting in a two pixel height reduction, a two pixel width reduction, and no shift in the center of alphanumeric character 670.

The foregoing discussion along with the Figures discloses and describes various exemplary implementations. These implementations are not meant to limit the scope of coverage, but, instead, to assist in understanding the context of the language used in this specification and in the claims. Accordingly, variations of the methods as well as systems and compositions of matter that differ from these exemplary implementations may be encompassed by the appended claims. Upon study of this disclosure and the exemplary implementations herein, one of ordinary skill in the art may readily recognize that various changes, modifications and variations can be made thereto without departing from the spirit and scope of the inventions as defined in the following claim.

What is claimed is:

1. A computer implemented method for creating an OCR image, comprising the steps of:
   obtaining a screen image of a computer screen from hardware operating to display the screen image upon the computer screen, the screen image at an initial resolution, an alphanumeric character being embedded within the screen image, the alphanumeric character derived directly from a computer generated font;
   converting the screen image into a grayscale image, the grayscale image being at the initial resolution; and
   transforming the grayscale image into an OCR image by applying a combination of steps to the grayscale image, the combination of steps comprising the steps of:
      increasing the resolution of the grayscale image including the alphanumeric character by increments between an initial resolution and a final resolution, the resolution being no more than doubled at each increment;
      removing signals from the grayscale image by applying one or more filters to the grayscale image;
      smoothing stairstepped portions of the alphanumeric character by applying anti-aliasing to stairstepped portions of the alphanumeric character;
      searching for a focus pixel by comparing a pixel value of a pixel with pixel values of neighboring pixels within a pixel range of the pixel, the pixel being deemed a focus pixel if the pixel is lying between darker pixels along an axis and if the pixel is lying between lighter pixels along a perpendicular axis; and
      replacing the pixel value of the focus pixel with a replacement pixel value.

2. The method, as in claim 1, wherein the initial resolution is equivalent to a screen resolution of the computer screen.

3. The method, as in claim 1, wherein the OCR image is of sufficient resolution and quality that an OCR engine can recognize alphanumeric characters imbedded within the OCR image.

4. The method, as in claim 1, wherein the computer screen forms a portion of a cellular telephone.

5. The method, as in claim 1, wherein the ratio of the final resolution to the initial resolution is within the range of from 200/72 to 300/72.

6. The method, as in claim 1, wherein the ratio of the final resolution to the initial resolution is at least 300/72.

7. The method, as in claim 1, wherein at least one of the one or more filters applied is chosen from the group consisting of an un-sharp mask and a Gaussian blur.

8. The method, as in claim 1, further comprising the step of:
   recognizing the alphanumeric character included within the OCR image using an OCR engine.

9. The method, as in claim 1, the combination of steps further comprising the step of:
   distinguishing alphanumeric characters in the grayscale image from background in the grayscale image by distributing by a weighting scheme to their byte-wise extremes pixel values of pixels within a grouping of pixels.

10. The method, as in claim 1, further comprising the step of:
    eliminating a bridge connecting a second alphanumeric character to the alphanumeric character by performing repetitively the step of detecting a focus pixel and the step of replacing the pixel value of the focus pixel with a replacement pixel value.

11. The method, as in claim 1, wherein the pixel range equals one pixel.

12. The method, as in claim 1, the combination of steps further comprising the step of:
    thinning the one or more alphanumeric characters.

13. The method, as in claim 12, wherein the step of thinning the alphanumeric character comprises the steps of:
    designating one or more pixels located about a center pixel as designated pixels, the center pixel having a center pixel value;
    choosing a chosen pixel value as the pixel value of the darkest of the designated pixels that is lighter than the center pixel; and
    replacing the center pixel value of the center pixel with the chosen pixel value.

14. A computer implemented method comprising the steps of:
    capturing a screen image from computer hardware of visual content displayable upon a computer screen, the screen image being pixilated and having an initial resolution equaling a screen resolution of the computer screen, the screen image including an alphanumeric character generated by the computer directly from a computer generated font;
    converting each pixel of the screen image into a grayscale value thereby transforming the screen image into a grayscale image, the grayscale image being at the initial resolution;
    transforming the grayscale image into an OCR image by:
       increasing the resolution of the grayscale image by increments between the initial resolution and a final resolution, the resolution being no more than doubled at each increment;
       removing signals from the grayscale image by applying one or more filters to the grayscale image;
       smoothing stairstepped portions of the alphanumeric character by applying anti-aliasing to stairstepped portions of the alphanumeric character, the stairstepped portions being confined to angled portions or curved portions of the alphanumeric character;
       distinguishing the alphanumeric character by distributing by a weighting scheme to their byte-wise extremes pixel values of pixels within a grouping of pixels;
       separating the alphanumeric character from a second alphanumeric character by replacing a pixel value of a pixel with a replacement pixel value if the pixel is lying between darker pixels along an axis and if the pixel is lying between lighter pixels along a perpendicular axis;
       thinning the alphanumeric character; and wherein the OCR image is at the final resolution, the OCR image being of sufficient resolution and quality that an OCR engine can recognize the alphanumeric character imbedded within the OCR image.

15. The method, as in claim 14, further comprising the step of:
    recognizing the one or more alphanumeric characters included within the OCR image using an OCR engine.

16. A nontransitory computer readable media storing a computer program, wherein the computer program comprises instructions that, when executed, cause a computer to perform the steps of:
    obtaining a screen image of a computer screen from hardware operating to display the screen image upon the computer screen, the screen image at an initial resolution, an alphanumeric character being embedded within the screen image, the alphanumeric character derived directly from a computer generated font;

converting the screen image into a grayscale image, the grayscale image being at the initial resolution; and transforming the grayscale image into an OCR image by applying a combination of steps to the grayscale image, the combination of steps comprising the steps of:

increasing the resolution of the grayscale image including the alphanumeric character by increments between an initial resolution and a final resolution, the resolution being no more than doubled at each increment;

removing signals from the grayscale image by applying one or more filters to the grayscale image;

smoothing stairstepped portions of the alphanumeric character by applying anti-aliasing to stairstepped portions of the alphanumeric character;

searching for a focus pixel by comparing a pixel value of a pixel with pixel values of neighboring pixels within a pixel range of the pixel, the pixel being deemed a focus pixel if the pixel is lying between darker pixels along an axis and if the pixel is lying between lighter pixels along a perpendicular axis; and replacing the pixel value of the focus pixel with a replacement pixel value.

\* \* \* \* \*